Nov. 3, 1959

A. BOUWERS 2,910,924

DEVICE FOR THE INSERTION AND REMOVAL
OF FILM IN MIRROR CAMERAS

Filed Sept. 15, 1953

INVENTOR.
Albert Bouwers
BY
Wenderoth, Lind & Ponack
ATTORNEYS

United States Patent Office 2,910,924
Patented Nov. 3, 1959

2,910,924

DEVICE FOR THE INSERTION AND REMOVAL OF FILM IN MIRROR CAMERAS

Albert Bouwers, The Hague, Netherlands, assignor to N.V. Optische Industrie "De Oude Delft," Delft, Netherlands Application September 15, 1953, Serial No. 380,183

Claims priority, application Netherlands September 19, 1952

2 Claims. (Cl. 95—31)

The invention relates to devices for inserting photographic film into position for exposure in cameras having curved image surfaces, and for discharging the exposed film therefrom. More particularly, it relates to such devices for use in mirror cameras, which are provided with an objective comprising a concave mirror and a correcting element and having rather strong image curvature.

This curvature makes it necessary to curve the film accordingly on the image surface. When the field of view of the objective is not too great, such a curvature is no objection, if cut films are used which are not larger or not much larger than the image size of the camera, for such cut films can very well be given the right form, as they are easily deformed to the desired shape when they are pressed against the image surface or exposure gate frame.

A disadvantage of the use of cut films is, however, that the devices for their supply generally give rise to difficulties. The films in the storage container often stick together, for example. Further, the transport mechanism is very sensitive to small deviations from the nominal dimensions and of the elastic properties of the cut films. This is inevitable, even in spite of particularly careful and therefore relatively expensive manufacture of the films, because the temperature and the degree of humidity, both of which have a strong influence on dimensions and physical properties of the films, generally cannot be controlled.

It is thus undesirable for all these reasons to use cut films and it is preferred to use strip film instead. The difficulty then arises, however, that with a given angular field of view, it is much more difficult to deform a piece of film forming part of a film strip than a single piece of cut film, so that with strip film it is much more difficult to obtain the right curvature than with a cut film, without being troubled by folds and creases.

According to the invention, a device for inserting photographic film into position for exposure in a camera having a curved image surface, and for discharging the exposed film therefrom, comprises a supply spool disposed outside the camera exposure field for carrying the unexposed film in the form of a film strip, means for leading the film strip so far into the exposure field that the foremost part of the strip covers the image surface, means for cutting off the said part of the strip, and means for pressing the said cut-off part of the strip to conform with the contour of the image surface while the exposure is made and for releasing it after the exposure.

In this way the problem of the supply of cut films is avoided, as the film is led to the image surface as film strip, while on the other hand by the cutting of the film before the exposure the advantage of cut films is obtained as regards the far better deformability, which is essential for mirror cameras.

It is preferable to perform the pressing of the film with a pressure plate provided with a cutting edge, so that the film can be cut and pressed simultaneously. In this way a considerable constructional simplification is obtained.

With the device according to the invention use can be made of the force of gravity for the removal of the cut-off and exposed part of the film strip. When the pressure plate is released after the exposure has been made, the exposed piece of film slides down vertically or obliquely along guiding means and reaches a storage container for the exposed pieces of film through an opening in the wall of the camera exposure field.

If the camera is incorporated into an apparatus which leaves no room for a storage container under the camera, means may be provided for engaging the cut-off part of the film strip and leading it out of the camera exposure field after the exposure has been made. In certain circumstances it may be useful to employ such means also when a storage container is placed under the camera.

An efficacious embodiment of the means for engaging the cut-off part of the strip and leading it out of the exposure field is one consisting of one or more elements movable towards and away from the image surface and provided with a point or hook, which during the pressing of the cut-off part of the strip against the image surface is pressed into the said cut-off part, and an element which, at the end of the movement out of the exposure field of the cut-off and exposed part of the strip, lifts the said part from the point or hook.

The means for the transport of the film strip from the supply spool to the image surface will be preferably coupled to the pressing and cutting mechanism, and also to the removal mechanism, if any, for the cut and exposed pieces of film.

In mirror cameras the image surface and the means for film insertion and removal obstruct part of the incident light. It is therefore desirable to keep this means as small as possible in so far as it is situated in the incident rays of light. The film strip led to the image surface must be provided with a completely lightproof screen, however, as otherwise, during the exposure, the part of the film between the wall of the camera exposure field and the image surface would also be exposed. This part of the film and its screening take up rather a lot of the light. This loss of light can be avoided, however, by providing means by which the film strip, after the foremost part has been cut off, is transported back so far that it is substantially wholly outside the camera exposure field.

The invention will now be more particularly described by way of example and with reference to the accompanying drawings.

Figure 1:
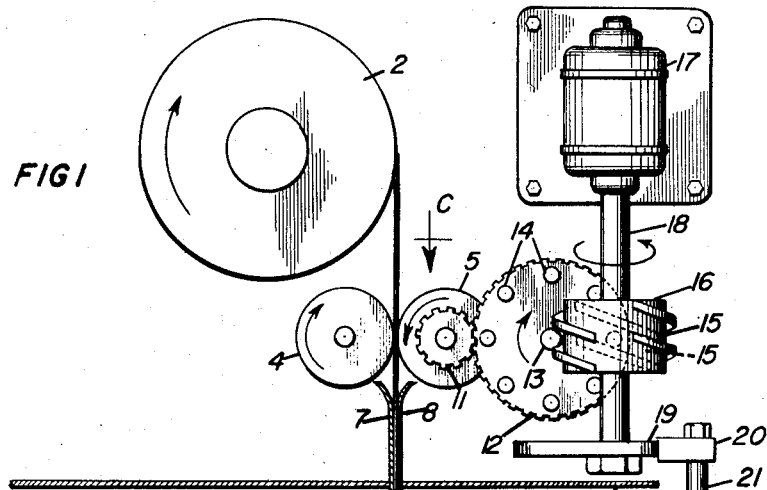
Figure 1 is a cross-section through the wall 1 of the housing of a mirror camera, in which the essential parts of the device for insertion and discharge of the film are also shown.

In Figure 1, a supply spool 2 is visible, on which the film is wound as a film strip 3. This film strip 3 can be led by transport rollers 4 and 5 via an opening 6 in the camera wall 1 and between lightproof screens 7 and 8, to a position between an exposure gate frame 9 and a pressure plate 10.

Figure 2:
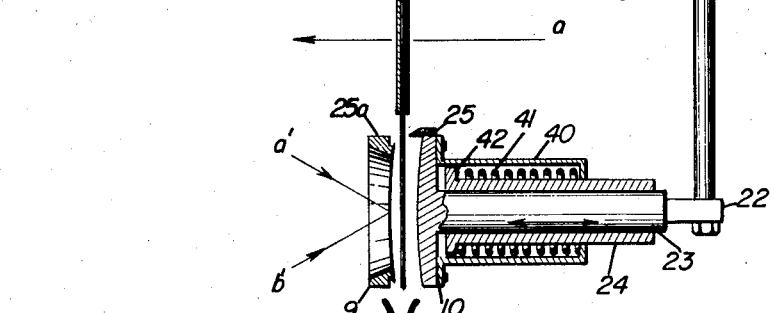
Figure 2 shows details of the device of Figure 1.
Figure 2:
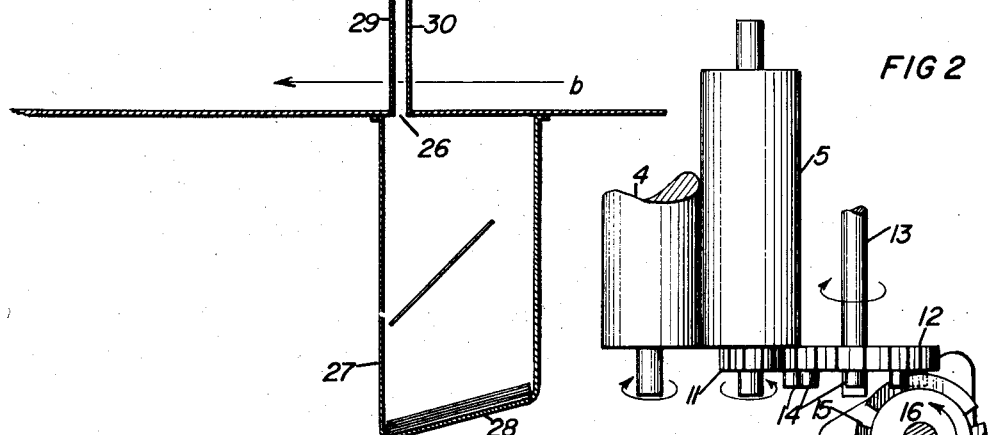

Transport roller 5 is driven by a cog-wheel 11, which engages with a cog-wheel 12. These cog-wheels are also visible in Figure 2, which is a view along the arrow C in Figure 1. It will be seen that the cog-wheel 12 is fixed to an axle 13 and is provided with a number of rollers 14. These can move in grooves 15 of a drum 16. Drum 16 can be rotated by a motor 17 through a shaft 18. The shaft 18 carries at its lower end a disk cam 19, against which bears a lever 20, which is fixed to a spindle 21. The spindle 21 is provided at its lower end with another lever 22, which bears upon the pressure plate 10 via a rod 23 which can slide in a guide 24. The pressure plate 10 has fixed to the rear thereof a socket 40 and the guide 24 has a flange 42 against which a spring 41 bears. The other end of spring 41 bears against socket 40 so that it may return plate 10 after being urged to operative position by lever 22. The pressure plate 10 is provided with a knife 25, which together with a cutting edge 25a on the exposure gate frame 9 forms the cutting device for the film.

The working of the device is as follows:

The transport roller 5 is set in motion by the motor 17 through the shaft 18, drum 16, the rollers 14, which during the transport period run in the drum 16 in the oblique parts of grooves 15, and the cog-wheels 12 and 11, so that the film strip 3 is moved forward one image space, until the extremity of the film strip 3 is completely between the image frame 9 and the raised pressure plate 10. Now the movement of the film stops, because the rollers 14 have come into the horizontal part of the groove 15 in the drum 16. The motor 17, however, continues to rotate, so that the film is pressed between the exposure gate frame 9 and the pressure plate 10 by means of the coupling described above between the shaft 18 and the pressure plate 10. At the same time the film is cut by the knife 25 and cutting edge 25a.

Now the exposure is made and when after that the pressure plate 10 is raised, the cut and exposed piece of film falls down owing to gravity and arrives via an opening 26 in the camera wall in a storage container 27, in which the pieces of film or exposures 28 pile up gradually.

The exposed pieces of film slide along grooved rails 29 and 30, which are shown in Figure 1 in a front view and in Figure 3 along section A—B of Figure 1. These rails intercept only very little light.

For the sake of clearness the rays of light *a* and *b* are shown in Figure 1 before they are incident on the concave mirror of the camera, which mirror is not drawn in the figure, while the corresponding reflected rays *a'* and *b'* are also shown.

The loss of light owing to the lightproof screens 7 and 8 can be avoided by providing means by which, after the cutting of the film, the transport rollers 4 and 5 rotate back so far that no part of the film strip remains in the camera exposure field. The part of the screens 7 and 8 which is within the camera exposure field can then be omitted, though edge guides similar to the rails 29 and 30 may be required.

I claim:

1. A device for inserting unexposed photographic film into position for exposure in a mirror objective camera having a curved image surface, and for discharging exposed film therefrom, comprising a camera housing, a supply spool disposed outside said camera housing for carrying said unexposed film in the form of a film strip, intermittently driven rollers means adapted to feed said film strip into said camera housing in such a manner that the leading part of said film strip covers said image surface, said camera housing having a first aperture offering passage to said film strip, a light-tight film channel extending between said aperture and said image surface, a film pressing plate adapted to press said leading end of the film to conform with the contour of the image surface while the exposure is made and to release said leading end of the film after exposure, cutting means cooperating with said pressing plate whereby said leading end of said film strip is severed from the remainder of said film strip prior to conforming with the contour of said image surface, said camera housing having a second aperture offering passage to said severed leading end of said film strip after exposure, and means for guiding said severed leading end of said film strip from said image surface to said second aperture.

2. A device as claimed in claim 1 wherein said cutting means comprises a cutting edge fixed to said pressing plate.

References Cited in the file of this patent

UNITED STATES PATENTS

| 1,143,722 | Palmer | June 22, 1915 |
| 1,919,433 | Hutchings | July 25, 1933 |
| 2,282,869 | Johnson et al. | May 12, 1942 |
| 2,593,189 | Rinia | Apr. 15, 1952 |

FOREIGN PATENTS

| 591,303 | Germany | Jan. 19, 1934 |